(12) United States Patent
Chedrawy et al.

(10) Patent No.: US 9,709,396 B2
(45) Date of Patent: Jul. 18, 2017

(54) AIR DEPLOYABLE OCEAN DRIFTER BUOY

(71) Applicant: MetOcean Data Systems Limited, Dartmouth (CA)

(72) Inventors: Anthony Chedrawy, Dartmouth (CA); Vincent Wilson, Beaverbank (CA); Andrew Lowery, Lake Echo (CA); Adam Widdis, Dartmouth (CA)

(73) Assignee: METOCEAN TELEMATICS LIMITED (CA)

( * ) Notice: Subject to any disclaimer, the term of this patent is extended or adjusted under 35 U.S.C. 154(b) by 19 days.

(21) Appl. No.: 14/865,224

(22) Filed: Sep. 25, 2015

(65) Prior Publication Data

US 2017/0089700 A1    Mar. 30, 2017

(51) Int. Cl.
*G01C 13/00* (2006.01)
*B63B 22/24* (2006.01)

(52) U.S. Cl.
CPC ............ *G01C 13/002* (2013.01); *B63B 22/24* (2013.01)

(58) Field of Classification Search
None
See application file for complete search history.

(56) References Cited

U.S. PATENT DOCUMENTS

| | | | | | |
|---|---|---|---|---|---|
| 3,696,453 | A | * | 10/1972 | Harris | B63C 9/22 114/190 |
| 3,722,690 | A | * | 3/1973 | Stenstrom | B63B 57/02 210/242.3 |
| 4,410,282 | A | * | 10/1983 | Leger | G01C 13/00 374/156 |
| 5,007,285 | A | * | 4/1991 | Dahlen | B63B 22/18 367/4 |
| 6,536,272 | B1 | * | 3/2003 | Houston | G01N 1/12 702/2 |

FOREIGN PATENT DOCUMENTS

| | | | |
|---|---|---|---|
| CN | 203544314 U | * | 4/2014 |
| CN | 104002927 A | * | 8/2014 |
| CN | 203767030 U | * | 8/2014 |
| JP | 2012071653 A | * | 4/2012 |
| KR | 101025931 B1 | * | 3/2011 |

* cited by examiner

*Primary Examiner* — Andre Allen
(74) *Attorney, Agent, or Firm* — Schmeiser, Olsen & Watts, LLP

(57) ABSTRACT

An air deployable drifter buoy assembly is provided. The air deployable drifter buoy assembly includes an air deployment tube in compliance with NATO A-Size packaging specifications and a foldable drifter buoy. In a first mode of operation the foldable drifter buoy is accommodated in the air deployment tube in a folded manner and in a second mode of operation the foldable drifter buoy is deployed in an unfolded manner with the foldable drifter buoy being in compliance with Davis CODE Drifter specifications.

14 Claims, 12 Drawing Sheets

AIR DEPLOYABLE OCEAN DRIFTER BUOY

FIELD OF TECHNOLOGY

The following relates to drifter buoys, and more particularly, to an air deployable ocean drifter buoy assembly with a foldable drifter buoy being accommodated in an air deployment tube in compliance with NATO A-Size packaging specifications and when deployed the drifter buoy being in compliance with Davis CODE Drifter specifications.

BACKGROUND

Air deployable drifter buoys are widely used in maritime search and rescue, tracking wreckage, persons in water, current tracking, environmental spill tracking and defense operations. Typically, the drifter buoys are equipped with sensors for sensing, for example, water temperature, air temperature, in regular intervals and providing the sensor data together with GPS position data to the operator via an antenna and satellite network.

One commonly used drifter buoy design complies with the Davis CODE Drifter buoy specification—four drag vanes of 19.7 in width and 27.6 in height with a midpoint of each drag vane being placed 25.6 in below the water surface—that will track the top meter of a body of water such as an ocean, which is advantageous for the various applications of drifter buoys as listed hereinabove. Most state of the art Davis CODE Drifter buoy designs employ 'Argos' satellite telemetry with control electronics being placed on a series of three Printed Circuit Board (PCB) assemblies connected to an antenna which has to be placed a substantial distance above the water surface and has to be powered by 10 Alkaline D-Cell batteries. Typically, the control electronics and batteries require a housing having a volume of approximately 345 in$^3$ and the antenna requires a housing having a volume of approximately 27 in$^3$.

Conformance with NATO A-size packaging specifications offers the ability to utilize common and standard air deployment infrastructure, equipment and procedures, thus deployment does not require special training for the operator. Furthermore, standard tools and equipment are already in place for the deployment of devices in conformance with NATO A-Size packaging specifications.

Furthermore, conformance with NATO A-Size packaging specifications substantially facilitates certification for air deployment by similarity to existing NATO A-Size products.

Unfortunately, none of the existing drifter buoy designs in compliance with the Davis CODE Drifter buoy specification are foldable to a size that fits in an air deployment tube in conformance with NATO A-Size packaging specifications—diameter 4.875 in and height 36.0 in resulting in a volume of 672 in$^3$—with the typical foldable Davis CODE Drifter buoy designs requiring a deployment tube of approximately 8.5 in diameter and 40 in height resulting in a volume of 2270 in$^3$.

It is desirable to provide an air deployable drifter buoy assembly with a foldable drifter buoy being accommodated in an air deployment tube in compliance with NATO A-Size packaging specifications and when deployed the drifter buoy being in compliance with Davis CODE Drifter specifications.

It is also desirable to provide an air deployable drifter buoy assembly with a foldable drifter buoy that can be unfolded absent utilization of compressed gas or pyrotechnic devices.

SUMMARY

An aspect relates to an air deployable drifter buoy assembly with a foldable drifter buoy being accommodated in an air deployment tube in compliance with NATO A-Size packaging specifications and when deployed the drifter buoy being in compliance with Davis CODE Drifter specifications.

Another aspect is to provide an air deployable drifter buoy assembly with a foldable drifter buoy that can be unfolded absent utilization of compressed gas or pyrotechnic devices.

According to embodiments of the present invention, there is provided an air deployable drifter buoy assembly. The air deployable drifter buoy assembly comprises an air deployment tube in compliance with NATO A-Size packaging specifications and a foldable drifter buoy. In a first mode of operation the foldable drifter buoy is accommodated in the air deployment tube in a folded manner and in a second mode of operation the foldable drifter buoy is deployed in an unfolded manner with the foldable drifter buoy being in compliance with Davis CODE Drifter specifications.

According to embodiments of the present invention, there is provided an air deployable drifter buoy assembly. The air deployable drifter buoy assembly comprises an air deployment tube in compliance with NATO A-Size packaging specifications and a foldable drifter buoy. In a first mode of operation the foldable drifter buoy is accommodated in the air deployment tube in a folded manner and in a second mode of operation the foldable drifter buoy is deployed in an unfolded manner with the foldable drifter buoy being in compliance with Davis CODE Drifter specifications. The drifter buoy comprises a slender main body and an electronics housing mounted to a telescopically movable mast accommodated in the main body such that the electronics housing is telescopically movable along a longitudinal axis of the main body with the mast being spring-loaded in a retracted position in the first mode of operation.

According to embodiments of the present invention, there is provided an air deployable drifter buoy assembly. The air deployable drifter buoy assembly comprises an air deployment tube in compliance with NATO A-Size packaging specifications and a foldable drifter buoy. In a first mode of operation the foldable drifter buoy is accommodated in the air deployment tube in a folded manner and in a second mode of operation the foldable drifter buoy is deployed in an unfolded manner with the foldable drifter buoy being in compliance with Davis CODE Drifter specifications. The drifter buoy comprises a slender main body and an electronics housing containing electronic components therein with the electronics housing being telescopically movable along a longitudinal axis of the main body. Four upper drag vane arms are movable mounted to the upper end of the main body and four lower drag vane arms are movable mounted to a lower end of the main body. Four drag vanes are disposed between respective upper and lower drag vane arms. Each of the drag vanes has a float via a tether mounted thereto. The floats are shaped to form together a cylinder fitting inside the air deployment tube in the first mode of operation with the cylinder containing therein: the main body; the upper and lower drag vane arms; the drag vane; and, the tethers.

According to embodiments of the present invention, there is provided an air deployable drifter buoy assembly. The air deployable drifter buoy assembly comprises an air deployment tube in compliance with NATO A-Size packaging specifications and a foldable drifter buoy. In a first mode of operation the foldable drifter buoy is accommodated in the air deployment tube in a folded manner and in a second mode of operation the foldable drifter buoy is deployed in an unfolded manner with the foldable drifter buoy being in compliance with Davis CODE Drifter specifications. The drifter buoy comprises a slender main body and an electronics housing containing electronic components therein with the electronics housing being telescopically movable along a longitudinal axis of the main body. The electronics housing contains electronic components for 'Iridium' satellite telemetry with the antenna being disposed in the same electronics housing.

The advantage of embodiments of the present invention is that it provides an air deployable drifter buoy assembly with a foldable drifter buoy being accommodated in an air deployment tube in compliance with NATO A-Size packaging specifications and when deployed the drifter buoy being in compliance with Davis CODE Drifter specifications.

A further advantage of embodiments of the present invention is that it provides an air deployable drifter buoy assembly with a foldable drifter buoy that can be unfolded absent utilization of compressed gas or pyrotechnic devices.

BRIEF DESCRIPTION

Some of the embodiments will be described in detail, with reference to the following figures, wherein like designations denote like members, wherein.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of the preferred embodiments herein below is with reference to an Air Deployable ocean drifter buoy, it will become evident to those skilled in the art that the embodiments of the invention are not limited thereto, but are adaptable for Ship Deployment or combinations thereof as well as for employment on other bodies of water such as lakes and rivers.

Figure 1A:
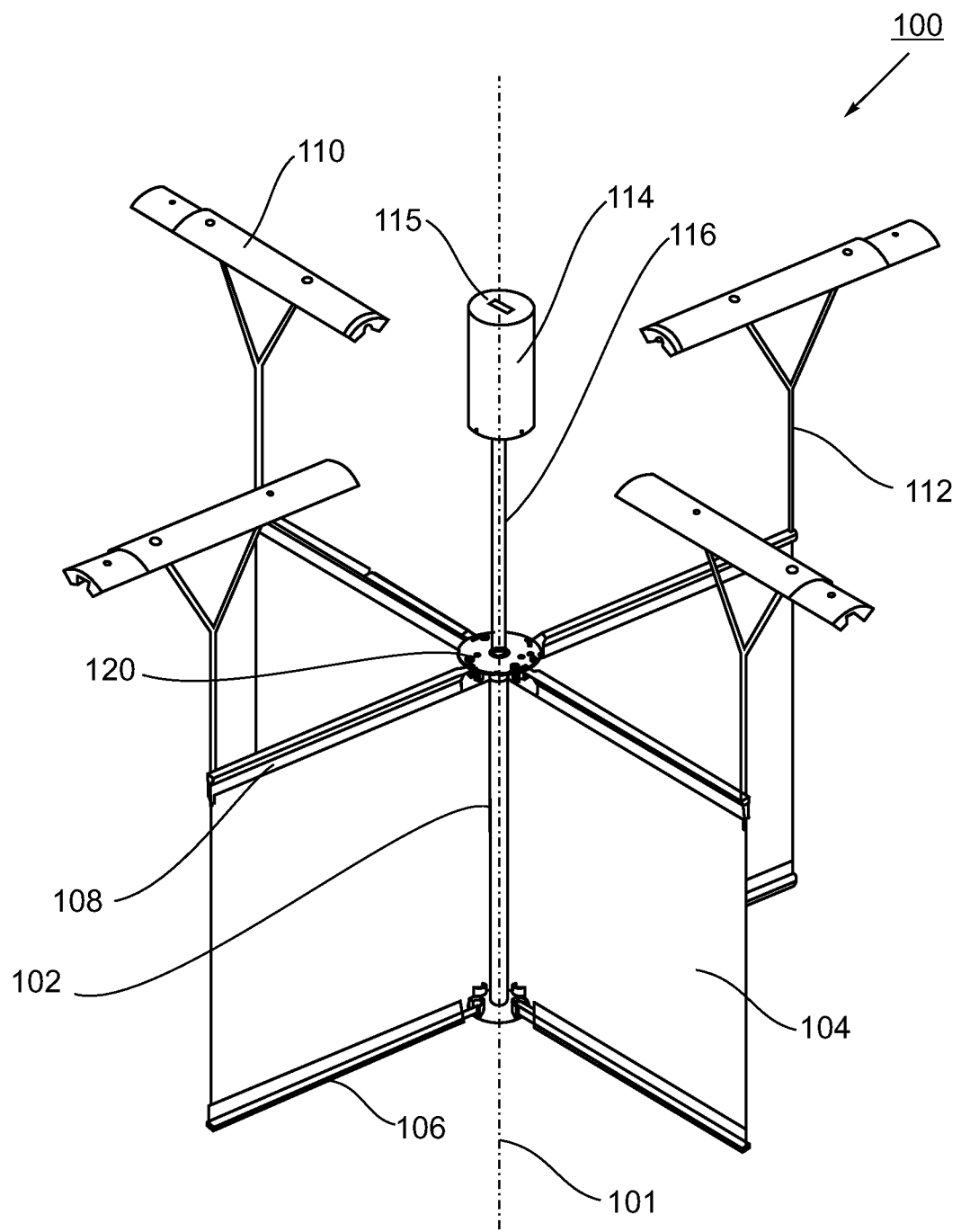
FIGS. 1a and 1b are simplified block diagrams illustrating in a perspective view and a side view, respectively, a foldable drifter buoy according to a preferred embodiment of the invention after deployment.
Figure 1B:
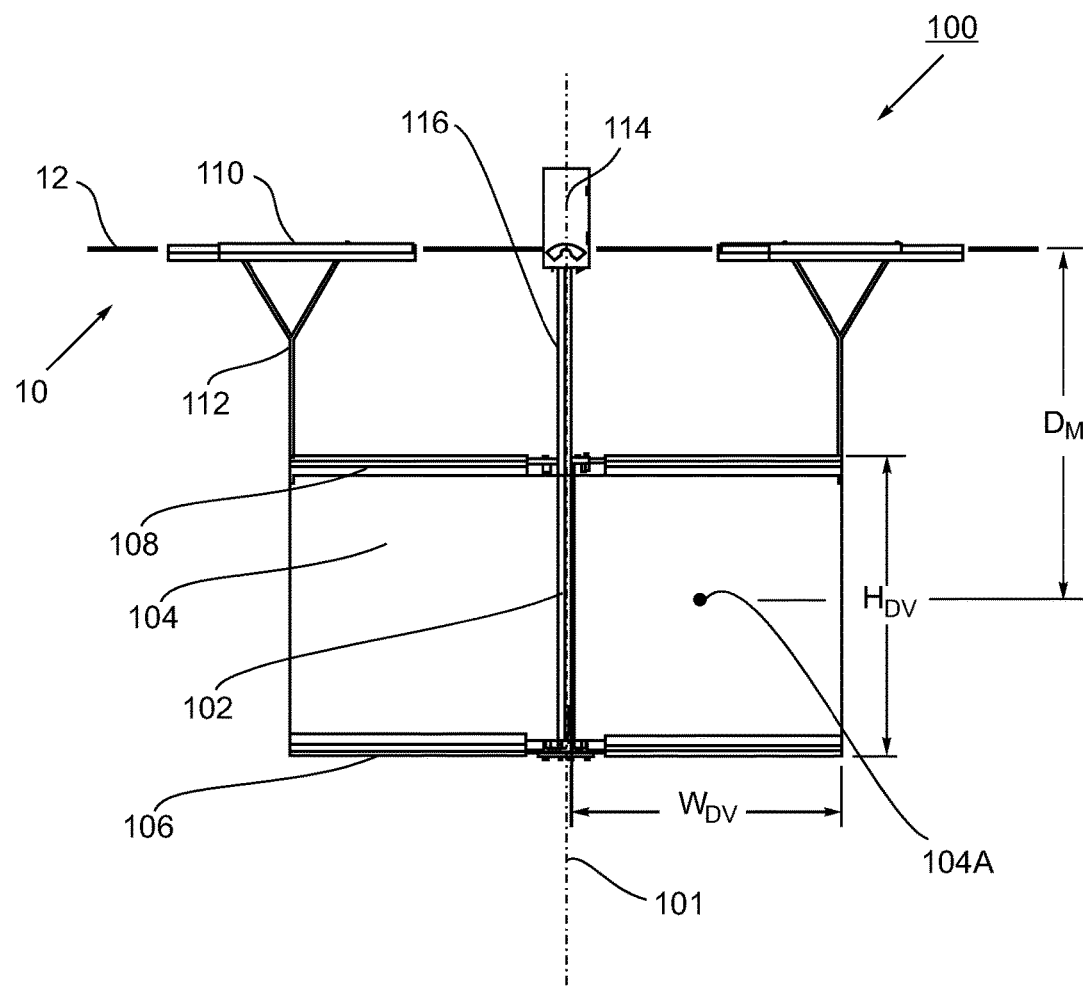
Figure 1C:
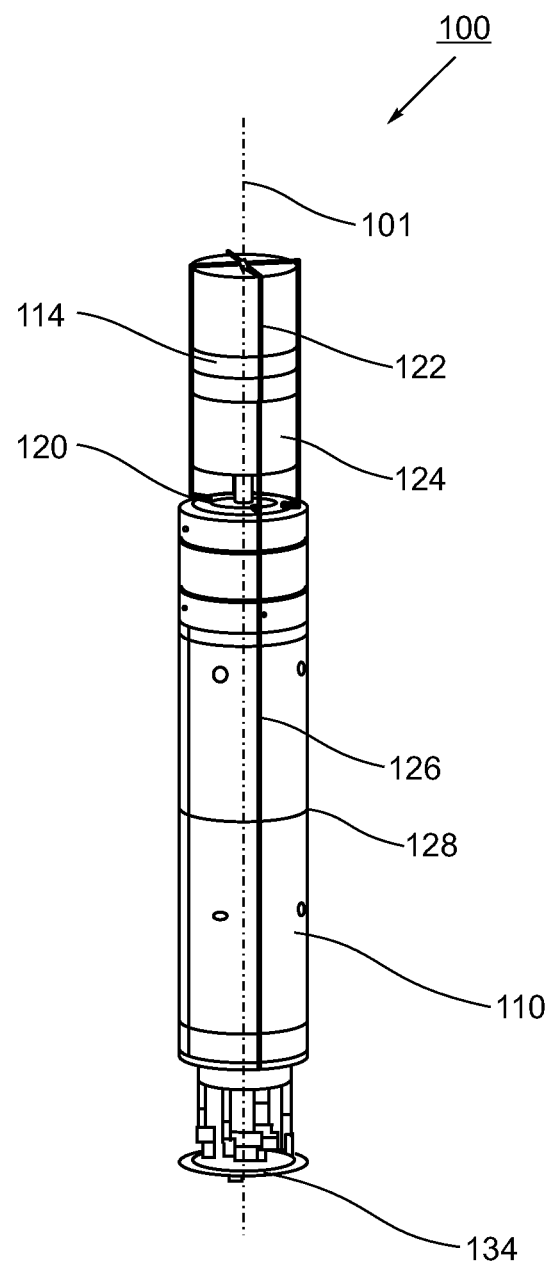
FIGS. 1c and 1d are simplified block diagrams illustrating in a complete perspective view and a detail perspective view, respectively, the foldable drifter buoy according to a preferred embodiment of the invention in a packaged state for deployment.
Figure 1D:
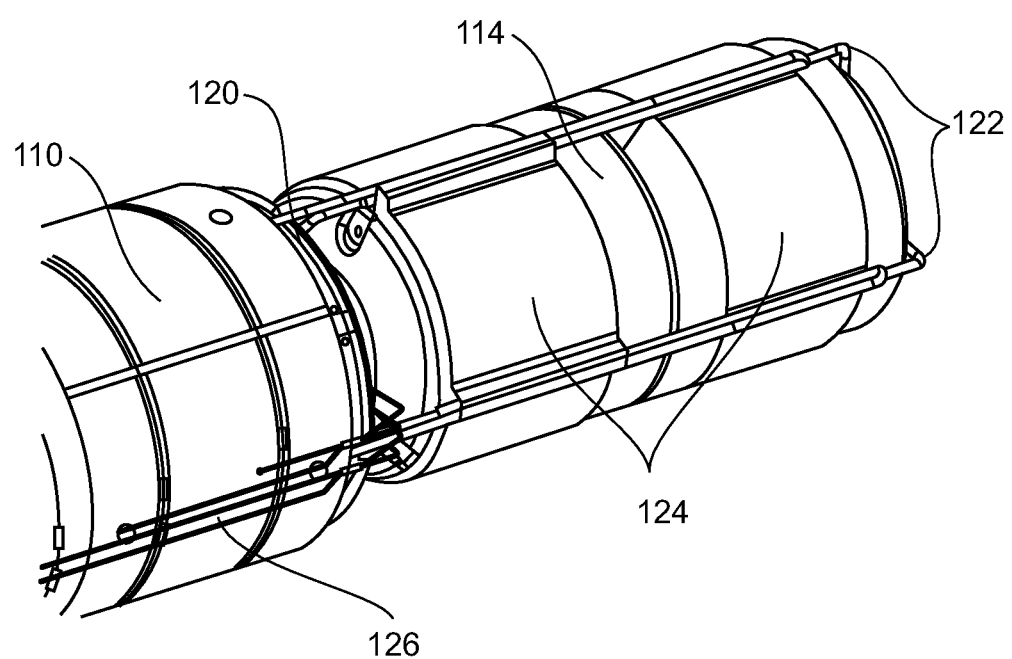

Referring to FIGS. 1a to 1d and 2a to 2d, an air deployable ocean drifter buoy 100 according to a preferred embodiment of the invention is provided. The drifter buoy 100 is foldable for being accommodated in a first mode of operation in an air deployment tube in compliance with NATO A-Size packaging specifications, as illustrated in FIGS. 1c and 1d. In a second mode of operation the drifter buoy 100 is deployed in an unfolded manner and in compliance with Davis CODE Drifter specifications—i.e. four drag vanes 104 having width $W_{DV}$ of 19.7 in and height $H_{DV}$ of 27.6 in with the midpoint 104A placed distance $D_M$ of 25.6 in below the water's 10 surface 12, and a submerged body 102 having less than 5.9 in diameter and 31.5 in height, as illustrated in FIGS. 1a and 1b.

The drifter buoy 100 comprises a slender main body 102 accommodating mast 116—having electronics housing 114 mounted thereto—telescopically movable along longitudinal axis 101 therein between a retracted position in the first mode of operation and an extended position in the second mode of operation such that a portion of the electronics housing 114 is placed above the waterline 12. Preferably, the main body 102 is a hollow cylinder having an outside diameter of approximately 1.0 in. Further preferably, the mast 116 is a hollow cylinder and is spring-loaded in the retracted position using compression spring 136 disposed inside the mast 116 between a beveled top of the mast 116 and bottom retaining plate 134 mounted to the main body 102 in a conventional manner. The mast 116 comprises a slider 116A disposed at a bottom portion thereof and adapted to slide along an inside wall of the main body 102 until being abutted by top retaining plate 120, while an upper portion of the mast 116 protrudes through aperture 120A disposed in the retaining plate 120. The main body 102, the mast 116 and the retaining plates 120, 134 are made, for example, of steel, marine-grade aluminum or fiber-reinforced composite materials using conventional manufacturing techniques.

Figure 2A:
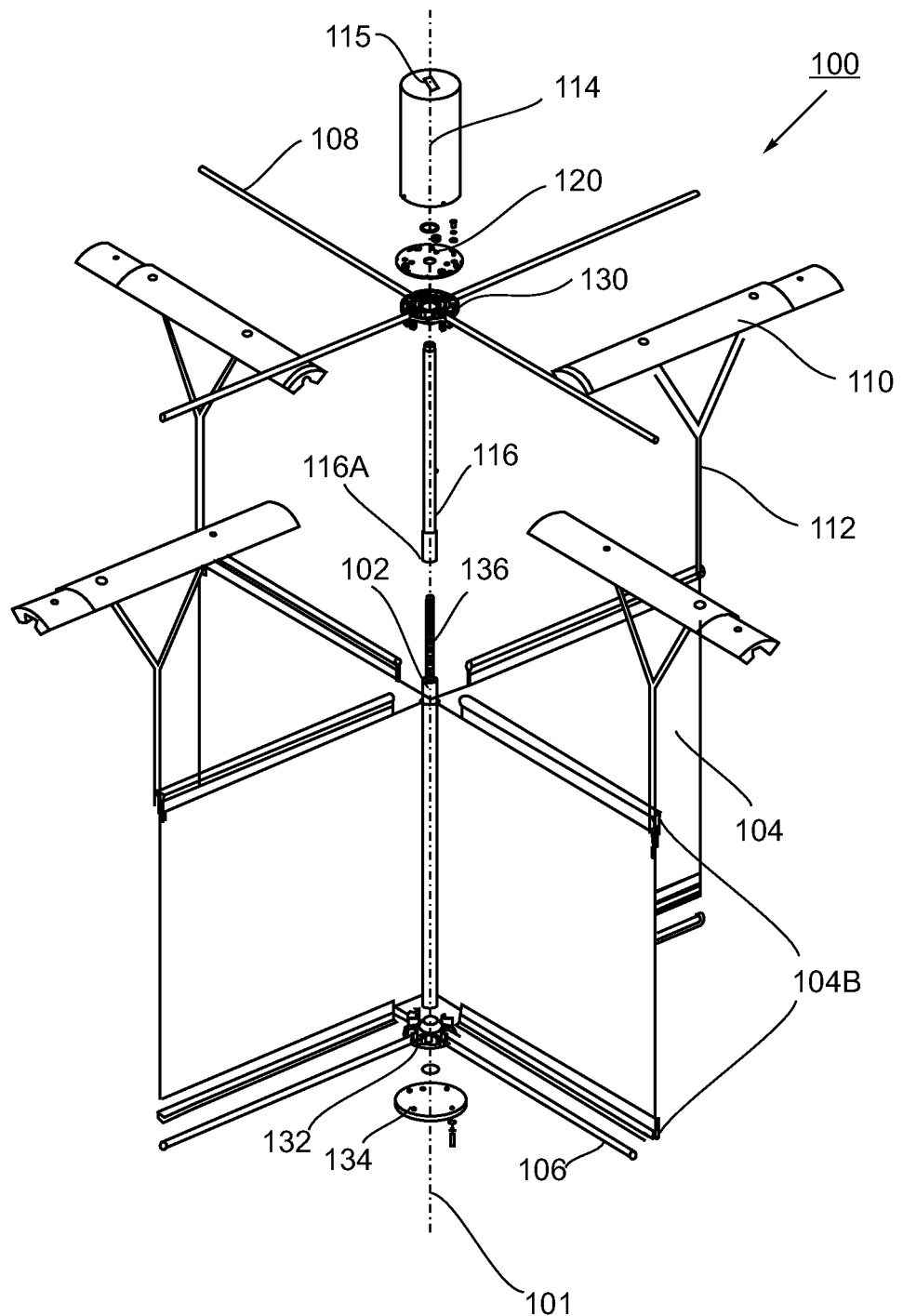
FIGS. 2a and 2b are simplified block diagrams illustrating in a complete exploded perspective view and a detail exploded perspective view, respectively, the foldable drifter buoy according to a preferred embodiment of the invention.
Figure 2B:
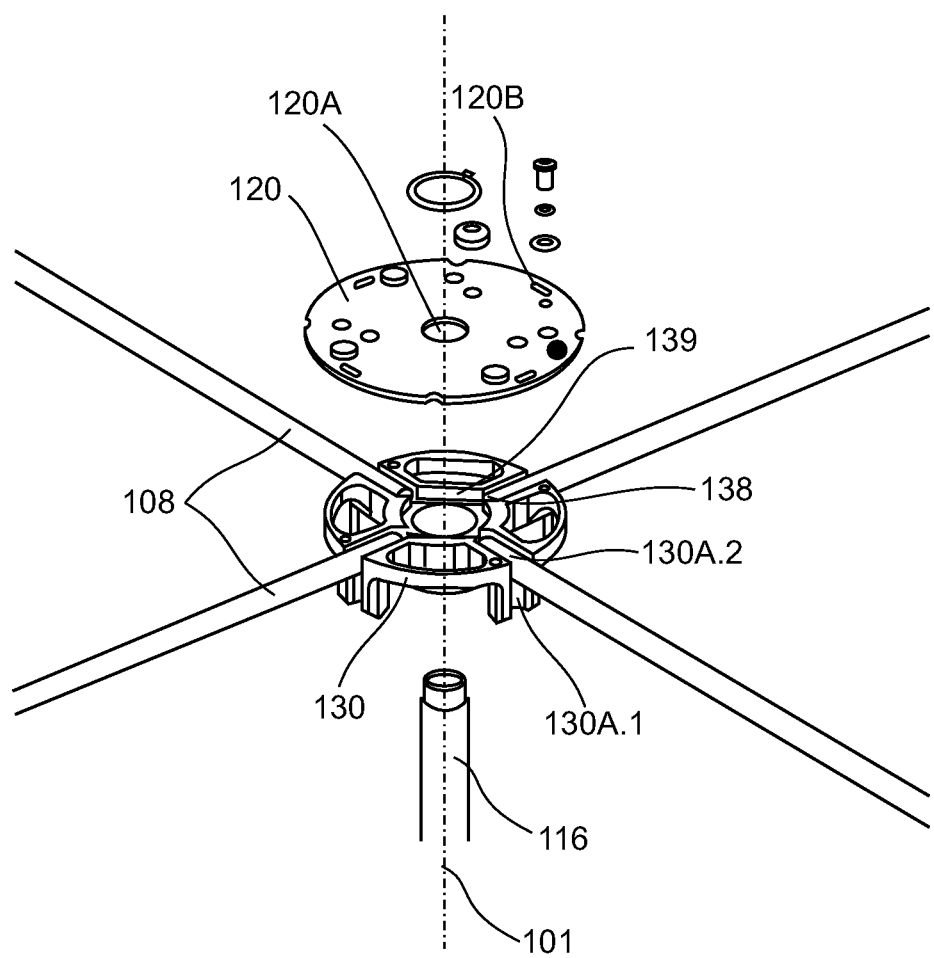

The four drag vanes 104 are disposed between respective upper drag vane arms 108 and lower drag vane arms 106. The upper drag vane arms 108 are movable mounted to bracket 130 with the drag vane arms 108 being movable between a first—folded downward—position with the arms being oriented substantially parallel to the longitudinal axis 101 and a second—unfolded—position with the arms being oriented substantially perpendicular to the longitudinal axis 101. The lower drag vane arms 106 are movable mounted to bracket 132 with the drag vane arms 106 being movable between a first—folded upward-position with the arms being oriented substantially parallel to the longitudinal axis 101 and a second—unfolded—position with the arms being oriented substantially perpendicular to the longitudinal axis 101. The upper and lower drag vane arms 108, 106 are pre-loaded in the first position. Preferably, the brackets 130, 132 comprise guiding channels for movable accommodating the respective drag vane arms 108, 106 therein. In the following the mechanism for moving the drag vane arms 108, 106 will be described for the upper drag vane arms 108. The mechanism for moving the lower drag vane arms 106 has the same design with inverted orientation. The guiding channels comprise a first portion 130A.1 oriented substantially parallel to the longitudinal axis 101 and a second portion 130A.2 oriented substantially perpendicular to the longitudinal axis 101, as illustrated in FIG. 2b. An elastic band such as a commercially available elastic shock cord or stretch cord 138 is mounted to an end portion of each of a pair of adjacent drag vane arms 108 in a conventional manner—for example, by fitting the shock cord through respective apertures disposed in the end portions and tying it thereto. Preferably, the elastic shock cord 138 is guided in a channel 139 disposed in the bracket 130. Alternatively, an elastic shock cord is mounted to the end of each drag vane arm and the bracket. When the drag vane arms 108 are released for deployment the elastic shock cord 138 pulls the same from the first channel portion 130A.1 to the second channel portion 130A.2 and holds the same in a socket formed by the second channel portion 130A.2 and the top retaining plate 120 having the bracket 130 mounted thereto in a conventional manner using, for example, a screw fastener. The brackets 130, 132 and the drag vane arms 106, 108 are made, for example, of marine-grade aluminum or fiber-reinforced composite materials using conventional manufacturing techniques.

The drag vanes 104 are made of a flexible material such as, for example, 210 Denier Nylon, and comprise pockets 104B at the top and bottom edge thereof. The drag vane arms 108, 106 are slid into the respective pockets 104B and accommodated therein. Optionally, the four drag vanes 104 are provided as a single unit with a cylindrical center body which is slid over the main body 102.

Figure 2C:
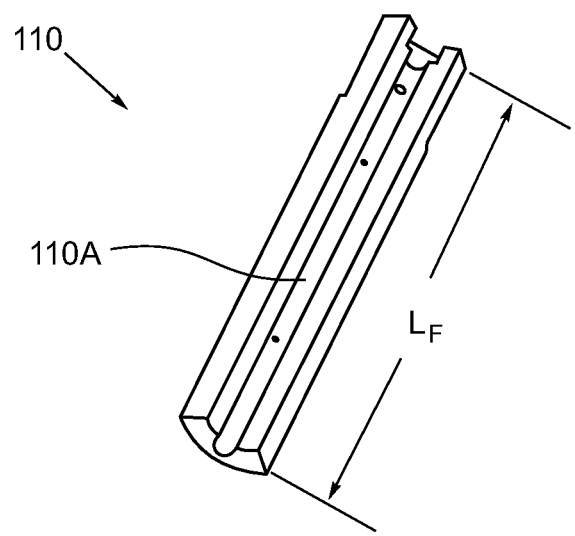
FIGS. 2c and 2d are simplified block diagrams illustrating in a perspective view and a bottom view, respectively, a float of the foldable drifter buoy according to a preferred embodiment of the invention.
Figure 2D:
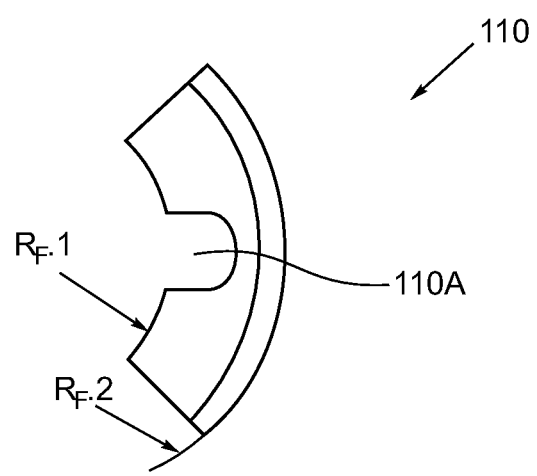

Each of the drag vanes 104 has a float 110 via a tether 112 mounted thereto, preferably, at an outer end of the drag vane. The tether 112 is made of, for example, a commercially available Nylon string or rope, and mounted to the drag vane 104 and the float 110 in a conventional manner—for example, by fitting the Nylon string or rope through respective apertures disposed in an drag vane end portion and the float and tying or sewing it thereto. Preferably, the four floats 110 are made of custom molded expanded polypropylene and are shaped to form together a cylinder fitting inside the air deployment tube in compliance with NATO A-Size packaging specifications in the first mode of operation with the cylinder containing therein the main body 102, the upper and lower drag vane arms 108, 106, the drag vanes 104, and the tethers 112. As illustrated in FIGS. 2c and 2d, each of the floats 110 forms a quarter section of the cylinder having an inner radius $R_F.1$ of approximately 1.25 in, an outer radius $R_F.0.2$ of approximately 2.15 in, and a length $L_F$ of approximately 18.75 in. Each of the floats 110 comprises a groove 110A adapted to accommodate the respective tether, a portion of the respective drag vane arm, and a portion of the drag vane pocket therein.

In order to reduce the size of the electronics unit of the drifter buoy 100, 'Iridium' satellite communication is employed compared to 'Argos' satellite communication used in state of the art drifter buoys. Using the Iridium satellite telemetry the controller of the drifter buoy 100 samples in regular time intervals data such as, for example, data received from a sea surface temperature sensor and GPS data. Before sending the data the controller first establishes a connection with an Iridium satellite before sending the data, instead of constant transmission in Argos satellite telemetry, thus substantially reducing power consumption resulting in a substantially reduced size of the battery pack for supplying the power—10 Alkaline AA-Cell batteries. Furthermore, data processing is substantially simpler using Iridium satellite telemetry since only one set of data is transmitted in each time interval instead of constant transmission, thus substantially reducing the size of the electronics resulting in the employment of a single PCB, and further reducing the size of the battery pack. The Iridium satellite telemetry employs a low profile dual band antenna that needs to be placed only slightly above the water surface. The Iridium satellite telemetry, its controller, GPS, sensors such as, for example, a sea surface temperature sensor, and the antenna are disposed in the electronics housing 114 having a diameter of approximately 3.5 in and a height of approximately 7.5 in, resulting in a volume of approximately 72 in$^3$, which is sufficiently small to fit the drifter buoy 100 inside the air deployment tube in compliance with NATO A-Size packaging specifications. Preferably, the antenna 115 is disposed near or at the top of the electronics housing 114. The electronics housing is made of, for example, a suitable plastic material such as Acrylonitrile Butadiene Styrene (ABS), PolyVinyl Chloride (PVC) or Nylon, using standard manufacturing techniques and is sealed in a waterproof fashion.

For packaging, the spring-loaded electronics mast 116 is pressed down into the main body 102 of the drifter buoy 100. To hold it in place, tethers 122—for example, Nylon cord—is draped over the top of the electronics housing 114 and looped through apertures 120B in retaining plate 120, as illustrated in FIGS. 1c, 1d, and 2b. Strips of water soluble tape 124—such as, for example, commercially available water soluble tape manufactured by 3M™—secure the tethers 122 in place to keep the mast 116 in the retracted position.

In the next step of packaging, the lower drag vane arms 106 are pulled out of their respective socket and folded upward—which also folds upward the lower portion of the respective drag vane 104, followed by folding the upper drag vane arms 108 downward—which also folds downward the upper portion of the respective drag vane 104. The floats 110—together with the tethers 112 are then placed over the folded drag vane arms 106, 108 with the upper drag vane arms being accommodated in the respective grooves 110A of the floats 110. Bindings 128—for example, Monofilament line—are then placed over the floats 110 and held by rip cords 126—for example, stainless steel wire rope—which are connected to the mast 116 in a conventional manner—for example, by fitting the rip cords 126 through respective mounting structures such as apertures or rings disposed in or on the mast 116 and crimping them thereto.

Figure 3A:
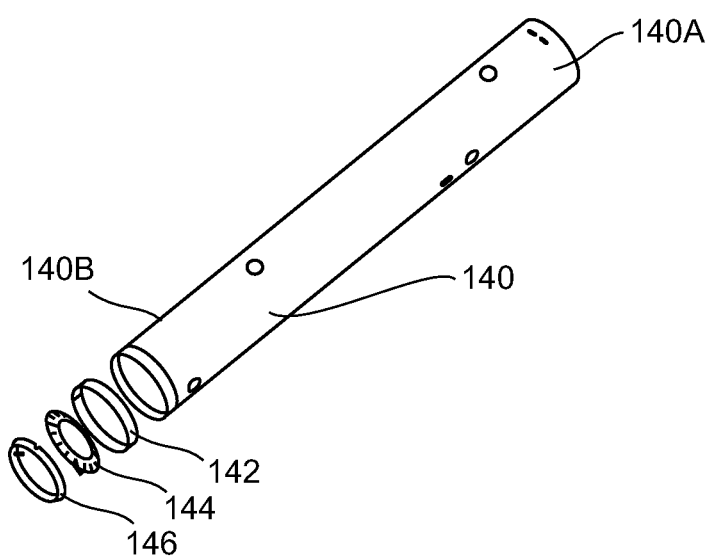
FIG. 3a is a simplified block diagram illustrating in a perspective view an air deployment tube for deploying the foldable drifter buoy according to a preferred embodiment of the invention.

Referring to FIG. 3a, an air deployment tube 140 in compliance with NATO A-Size packaging specifications for accommodating the drifter buoy 100 therein is provided. The air deployment tube 140 is prepared for holding the packaged drifter buoy 100, as illustrated in FIG. 1c, therein by: installing brace 142 around the bottom of the tube; installing and flattening collapsible deployment plate 144 in place at the bottom 140B of the air deployment tube 140 and then inserting support ring 146 into the collapsible deployment plate 144.

NATO A-Size products are air deployed using a variety of standard procedures, such as Cartridge Actuated Device (CAD) deployment and breach assembly deployment. In order to withstand the rigors of CAD and breach assembly deployment, the air deployment tube 140 is made of a sufficiently strong material such as, for example, ABS using a conventional plastic molding process or machining of extruded stock tubing.

Figure 3B:
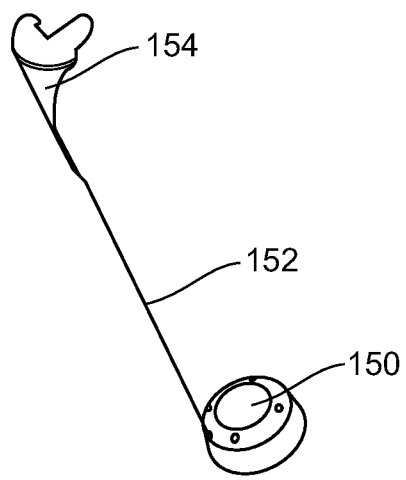
FIG. 3b is a simplified block diagram illustrating in a perspective view an exit ballast assembly for deploying the foldable drifter buoy according to a preferred embodiment of the invention.
Figure 3C:
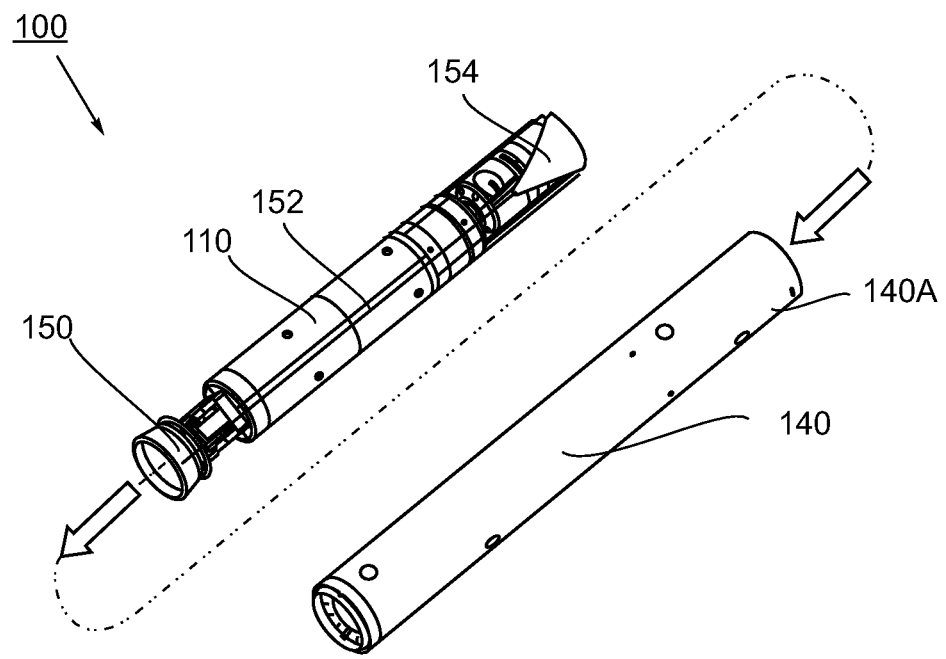
FIG. 3c is a simplified block diagram illustrating in a perspective view insertion into the air deployment tube of the packaged foldable drifter buoy according to a preferred embodiment of the invention.
Figure 3D:
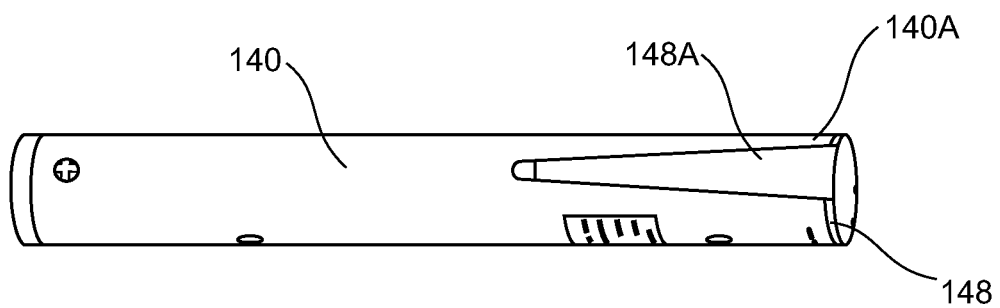
FIG. 3d is a simplified block diagram illustrating in a perspective view the packaged air deployment tube for deploying the foldable drifter buoy according to a preferred embodiment of the invention.

Prior insertion into the air deployment tube 140, an exit ballast assembly, illustrated in FIG. 3b, is mounted to the packaged drifter buoy 100. Exit ballast 150 of sufficient weight—made of, for example, steel—is attached to flap 154—made of, for example, aluminum sheet material or plastic—via wire rope 152 in a conventional manner—for example, by fitting the wire rope 152 through respective mounting structures such as apertures disposed in the exit ballast 150 and the flap 154 and crimping it thereto. When mounted to the packaged drifter buoy 100, the flap 154 hooks onto the top of the drifter buoy 100 while the same rests on top of the exit ballast 150. The packaged drifter buoy 100 with the exit ballast 150 mounted thereto is then slid into the air deployment tube 140 through its top 140A, as indicated by the block arrows in FIG. 3c, and secured by parachute cap 148—made of, for example, ABS or Nylon—mounted to the top 140A of the air deployment tube 140 in a conventional manner using, for example, friction fastening, form fastening or screw fastening, as illustrated in FIG. 3d. The parachute cap 148 has a parachute disposed therein (not shown) which is covered by wind-flap 148A.

There are a variety of different weights and Center of Gravities (COG) that can be certified by similarity to existing NATO A-Size products. The drifter buoy 100 together with the air deployment tube 140 has a weight of 19.0 lbs and the COG is located 15.5 in from the bottom 140B of the air deployment tube 140. Based on the weight and COG, parachute size and type are specified by NATO A-Size standards. This parachute only controls the flight path and orientation of the air deployment tube 140, as opposed to retarding the descent.

Figure 4A:
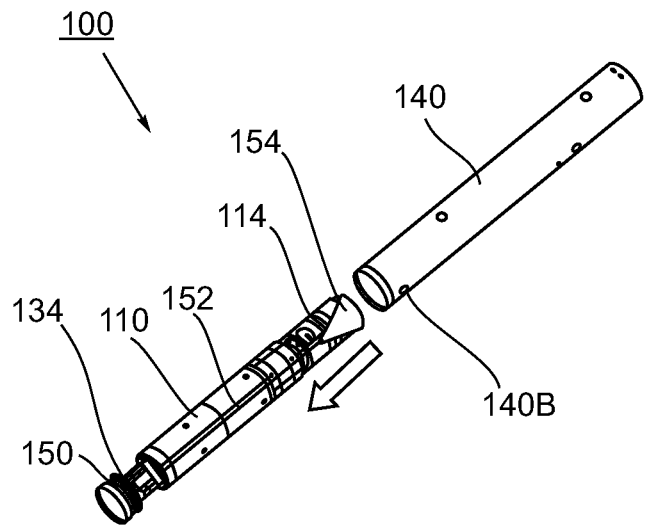
FIG. 4a is a simplified block diagram illustrating in a perspective view the deployment of the packaged foldable drifter buoy according to a preferred embodiment of the invention.

The bottom 140B of the air deployment tube 140 hits the water first since the parachute controls the descent of the deployment tube 140. Upon hitting the water, the collapsible deployment plate 144 collapses and falls out of the deployment tube 140 allowing the drifter buoy 100 to slide out the bottom 140B of the air deployment tube 140, as indicated by the block arrow in FIG. 4a. The parachute holds some air and keeps the deployment tube 140 near the surface of the water while the drifter buoy 100 slides out of the air deployment tube 140 with the help of the exit ballast assembly.

Figure 4B:
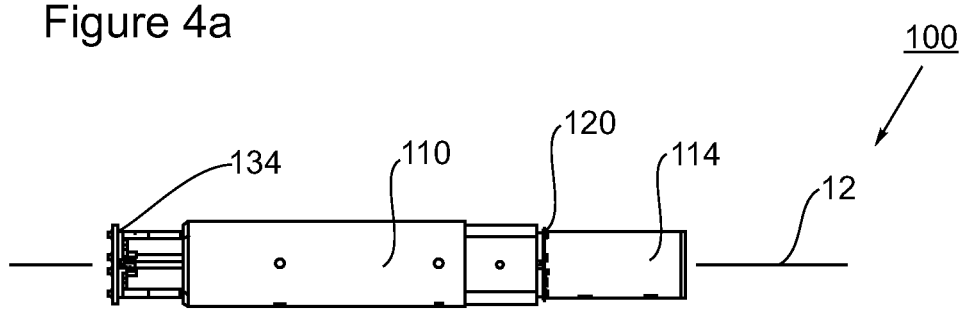
FIGS. 4b to 4f are simplified block diagrams illustrating in side views various stages of the unfolding process of the foldable drifter buoy according to a preferred embodiment of the invention.
Figure 4C:
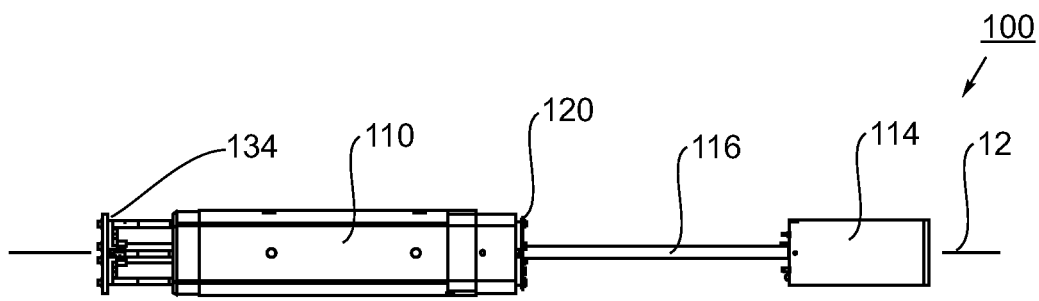
Figure 4D:
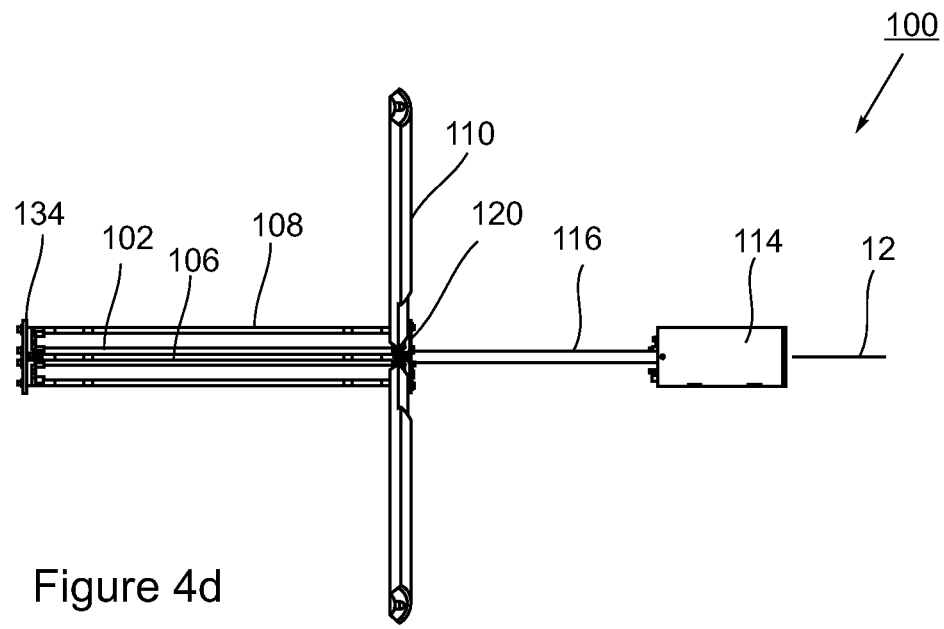
Figure 4E:
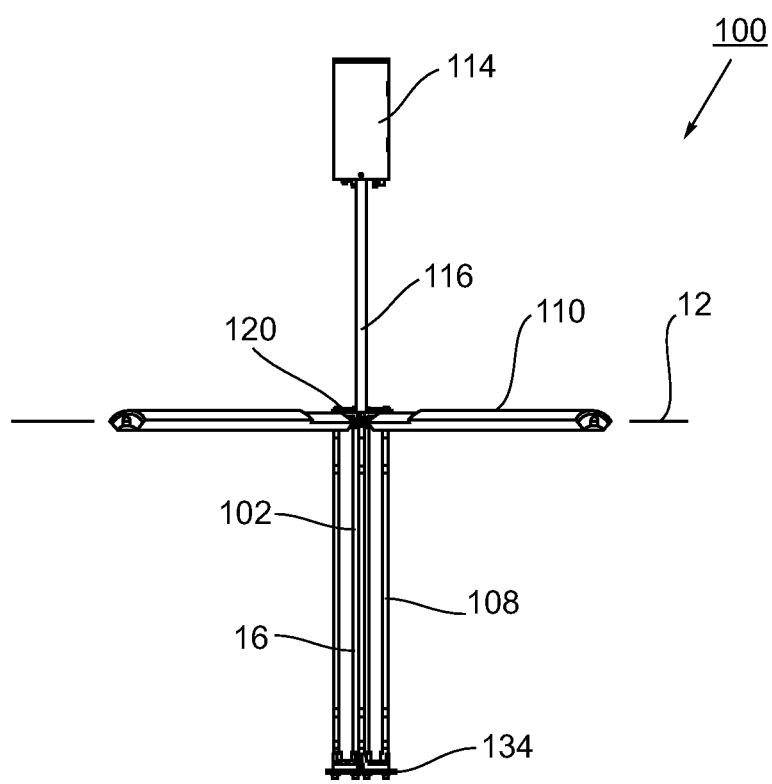
Figure 4F:
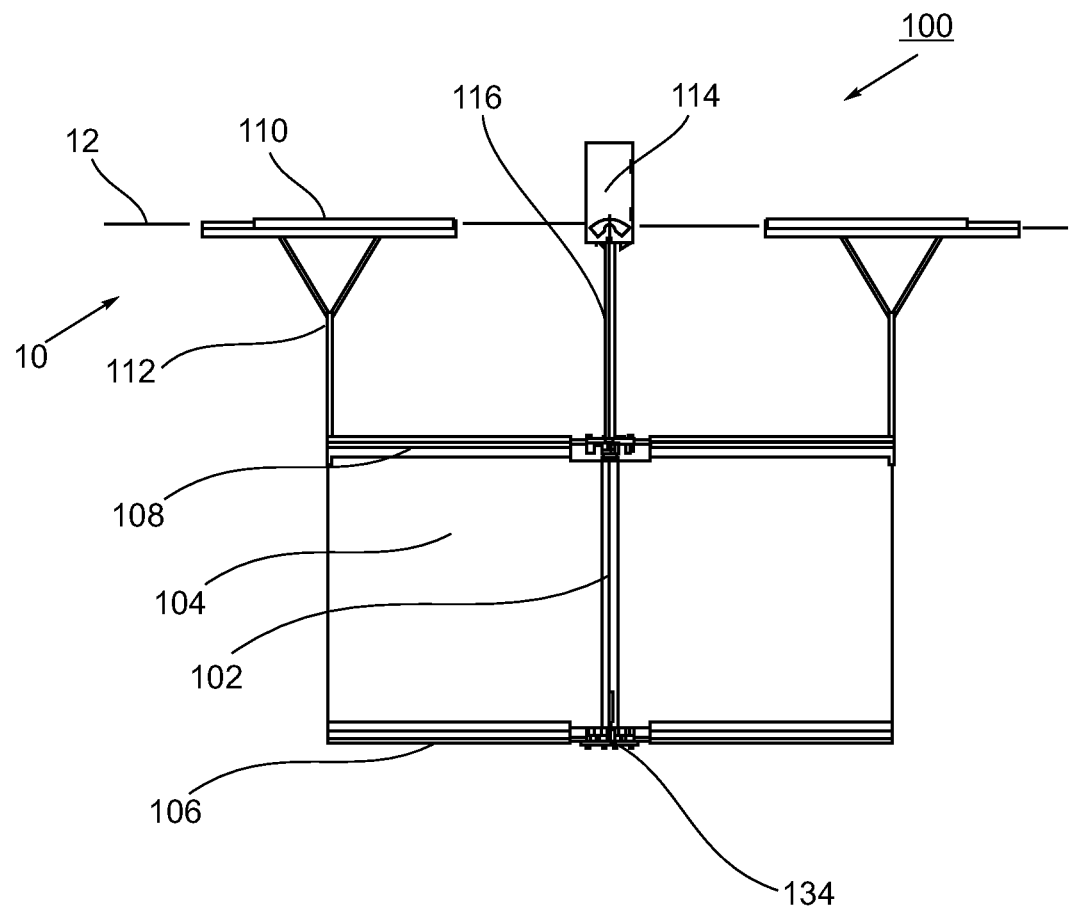

After release from the air deployment tube 140, the ballast separates from the drifter buoy 100 and sinks to the sea floor while the drifter buoy rises to the water surface 12 and floats as illustrated in FIG. 4b. After the water soluble tape 124 is dissolved, the tethers 122 are released, allowing the mast 116 to move into the extended position, as illustrated in FIG. 4c. The mast 116 pulls the rip cords 126 that release the bindings 128 which release the floats 110 as illustrated in FIG. 4d. The drifter buoy 100 then transitions into the position illustrated in FIG. 4e with the ends of the floats connected to the retaining plate 120 via water soluble tethers and the lower drag vane arms 106 held up by water soluble tape. After the water soluble tethers and tape are dissolved, the floats 110 and the lower drag vane arms 106 are released and the drifter buoy 100 assumes the configured state—second mode of operation—illustrated in FIG. 4f.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. An air deployable drifter buoy assembly comprising:
   an air deployment tube in compliance with NATO A-Size packaging specifications; and
   a foldable drifter buoy, in a first mode of operation the foldable drifter buoy being accommodated in the air deployment tube in a folded manner and in a second mode of operation the foldable drifter buoy being deployed in an unfolded manner with the foldable drifter buoy being in compliance with Davis CODE Drifter specifications;
   wherein the drifter buoy comprises a slender main body and an electronics housing containing electronic components therein with the electronics housing being telescopically movable along a longitudinal axis of the main body.

2. The air deployable drifter buoy assembly according to claim 1 wherein the drifter buoy comprises:
   four upper drag vane arms movable mounted to the upper end of the main body and four lower drag vane arms movable mounted to a lower end of the main body; and
   four drag vanes disposed between respective upper and lower drag vane arms.

3. The air deployable drifter buoy assembly according to claim 2 wherein each of the drag vanes has a float via a tether mounted thereto.

4. The air deployable drifter buoy assembly according to claim 3 wherein the floats are shaped to form together a cylinder fitting inside the air deployment tube in the first mode of operation with the cylinder containing therein: the main body; the upper and lower drag vane arms;
   the drag vane; and the tethers.

5. The air deployable drifter buoy assembly according to claim 1 wherein the electronics housing is mounted to a telescopically movable mast accommodated in the main body.

6. The air deployable drifter buoy assembly according to claim 5 wherein the mast is spring-loaded in a retracted position in the first mode of operation.

7. The air deployable drifter buoy assembly according to claim 6 wherein the mast is held in the retracted position using water soluble tape.

8. The air deployable drifter buoy assembly according to claim 7 wherein in the second mode of operation the mast is extended such that a portion of the electronics housing is placed above a waterline.

9. The air deployable drifter buoy assembly according to claim 2 wherein the upper and lower drag vane arms are movable between a first position with the arms being oriented substantially parallel to the longitudinal axis and a second position with the arms being oriented substantially perpendicular to the longitudinal axis.

10. The air deployable drifter buoy assembly according to claim 9 wherein the upper and lower drag vane arms are pre-loaded in the first position.

11. The air deployable drifter buoy assembly according to claim 10 wherein the electronics housing is mounted to a telescopically movable mast accommodated in the main body with the mast being spring loaded in the first mode of operation, wherein each of the drag vanes has a float via a tether mounted thereto, and wherein the upper and lower drag vane arms and the floats are held in the first mode of operation using a rip cord connected to the mast.

12. The air deployable drifter buoy assembly according to claim 10 wherein an end of each of a pair of the drag vane arms is mounted to a shock cord for pre-loading the drag vane arms in the first position.

13. The air deployable drifter buoy assembly according to claim 1 wherein the electronics housing contains electronic components for 'Iridium' satellite telemetry.

14. The air deployable drifter buoy assembly according to claim 13 wherein an antenna for the 'Iridium' satellite telemetry is disposed in the electronics housing.

\* \* \* \* \*